US007469879B2

(12) United States Patent
Aoki

(10) Patent No.: US 7,469,879 B2
(45) Date of Patent: Dec. 30, 2008

(54) THROTTLE DEVICE AND MOTOR THEREFOR

(75) Inventor: Sadayuki Aoki, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/580,113

(22) PCT Filed: Nov. 21, 2003

(86) PCT No.: PCT/JP03/14921

§ 371 (c)(1),
(2), (4) Date: May 19, 2006

(87) PCT Pub. No.: WO2005/049991

PCT Pub. Date: Jun. 2, 2005

(65) Prior Publication Data

US 2007/0069170 A1 Mar. 29, 2007

(51) Int. Cl.
*F16K 31/02* (2006.01)

(52) U.S. Cl. .................................. 251/129.11; 251/305

(58) Field of Classification Search ............ 251/129.11, 251/129.12, 129.13, 305, 306, 307, 308
See application file for complete search history.

(56) References Cited

U.S. PATENT DOCUMENTS 5,868,114 A * 2/1999 Kamimura et al. .......... 123/399
5,979,405 A 11/1999 Sato et al.
6,067,958 A * 5/2000 Kamimura et al. .......... 123/337
6,860,466 B2 * 3/2005 Sakurai et al. ......... 251/129.11
2002/0171059 A1 11/2002 Sakural et al.

FOREIGN PATENT DOCUMENTS

JP 47-607 1/1972
JP 52-51976 4/1977
JP 52-127616 10/1977
JP 10-252510 9/1998
JP 2001-346351 12/2001
JP 2002-161759 6/2002

(Continued)

OTHER PUBLICATIONS

International Search Report.

(Continued)

*Primary Examiner*—John K Fristoe, Jr.
(74) *Attorney, Agent, or Firm*—Crowell & Moring LLP

(57) ABSTRACT

A motor is properly aligned with a throttle valve and vibration resistance of the motor is improved.

In a throttle device having a motor for driving a throttle valve, the motor is inserted into a motor casing provided in a throttle body. A portion on the output-shaft side of the motor is held in its radial direction in the vicinity of the motor-insertion opening of the motor casing. A portion opposite to the output-shaft side of the motor is provided with elastic pieces or elastic projections. The motor and the elastic pieces or elastic projections are formed in a single piece, or the elastic pieces or elastic projections are attached to the motor. The elastic pieces or elastic projections are deformed inwardly of the radial direction of the motor so that the portion opposite to the output-shaft side of the motor is supported in its radial direction in the motor casing.

18 Claims, 5 Drawing Sheets

FOREIGN PATENT DOCUMENTS

| | | |
|---|---|---|
| JP | 2002-339766 | 11/2002 |

OTHER PUBLICATIONS

Japanese Office Action dated Nov. 13, 2007 with an English language translation (six (6) pages).

Figures 6-10 of Japanese patent laid open No. 2001-346351 (two (2) sheets).

Japanese office action mailed Feb. 19, 2008 with English translation (4 pages).

* cited by examiner

THROTTLE DEVICE AND MOTOR THEREFOR

TECHNICAL FIELD

This invention relates to a throttle device and a motor therefor used to control the flow rate of air flowing into a cylinder of an internal-combustion engine.

BACKGROUND ART

A throttle device wherein throttle valves disposed in an air-intake passage of a throttle body are electrically driven by a motor is already known. A body of the motor is housed in a motor casing, and the throttle body and the motor casing are formed as a single piece.

Proposed is the art of improving vibration resistance of such a body of the motor by fixing its front and rear ends in its radial direction (Both-end supporting structure). The following mechanisms for holding the output shaft and the rear end (an end opposite to the output-shaft side) of such a motor are disclosed.

According to Japanese Patent Laid-Open Nos. 2002-339766 and H10-252510, the rear end of the motor is held by adding components to the rear end of such a motor.

To put it more concretely, according to Japanese Patent Laid-Open No. 2002-339766, a washer is used to hold the rear end of a motor. The washer is a ring of a plate spring. The washer has an inner edge (the plate spring) which is flexible in an axial direction by making slits in a radial direction thereof. The washer is press-fitted into a position close an inner bottom (a deep recess position) of the motor casing in advance of inserting the motor into the motor casing. Then, when the motor is inserted into the motor casing, the rear end side portion of the motor is inserted into inner circumference of the washer, causing the inner cut zone of the washer to bend backward. Thus, the rear end of the motor is held in its radial directions by the washer.

On the other hand, according to Japanese Patent Laid-Open No. H10-252510, the rear end of a motor is inserted into an elastic O-ring and the motor with the elastic O-ring is inserted into the motor casing. Thus, the rear end of the motor is held in its radial directions by the elastic O-ring in the motor casing.

In the case of the former prior art, when the motor is inserted into the motor, casing to bend the inner cut zone of the washer backward. During such motor insertion process, the outside of the motor body (yoke) may be scraped by the inner edge of the washer, and metal scraps may be produced. In addition, when inserting the motor into the motor casing, the motor may be inserted having dislingnment and held in such a state because there is no means of aligning the center of the rear end of the motor. The disalignment of the center line of the motor with the center line of the motor casing means the disalignment of the motor's driving gears with a pinion gear and an intermediate gear and causes an error in mounting the motor.

In the case of the latter prior art, when the motor with the elastic O-ring is inserted into the motor casing, the elastic O-ring may be distorted or damaged.

The object of the present invention is to provide a throttle device with a motor, which is free from the above problems and of relatively simple construction.

DISCLOSURE OF THE INVENTION

According to the present invention, in a throttle device with a motor for driving a throttle valve, the motor is housed in a motor casing provided in a throttle body. Additionally, an output-shaft side of the motor (here, it's also called as "front side or front end") is held in its radial directions in the vicinity of the motor casing's opening for inserting the motor into the motor casing. Another side (it's also called "rear side" or "rear end") opposite to the output shaft is provided with projections (elastic projections, for example), which are deformed inwardly in a radial directions. The motor and the elastic projections are formed in a single piece, or the elastic projections are attached to the motor body. According to the deformation of the projection, the projections contact to the inside surface of the motor casing adding pressure, the rear end of the motor is held and fixed in its radial direction in the motor casing.

The elastic projections may be bent projections or lugs arranged circumferentially of the rear end of the motor.

With the above configuration, the motor is aligned with the motor casing immediately before the motor body is fully inserted into the motor casing; therefore, the motor can be properly aligned (alignment in its radial direction) with the throttle body.

When the motor is further inserted (fully inserted) into the motor casing, the elastic projections of the end opposite to the output-shaft side (rear end) of the motor are pressed down in the radial direction of the motor by the inside surface of the motor casing; thus, the rear end of the motor is held and fixed in its radial directions in the motor casing, the motor output shaft is kept precisely in parallel with an intermediate gear shaft and a throttle valve shaft. Therefore, the motor gear engages with the intermediate gear in good condition. That is, this arrangement is prevent from disalignment of the motor and no good mesh of gears with no good gear pitch due to such disalignment. As described above, the portion on the output-shaft side in the motor body is fixed to the throttle body, and the rear side of the motor body is held and fixed in its radial directions by the pressed-down (preferably elastic) projections in the motor casing; therefore, the motor's vibration in its radial directions is held down. Thus, the vibration resistance of the motor is improved. As described above, the rear side portion of the motor is held and fixed inside the casing by the elasticity of the pressed-down elastic projections. Alternatively, the rear side portion of the motor may be held and fixed by similar projections, for example, which are press-fitted into the motor casing to be physically deformation.

BEST MODE FOR CARRYING OUT THE INVENTION

Figure 1:
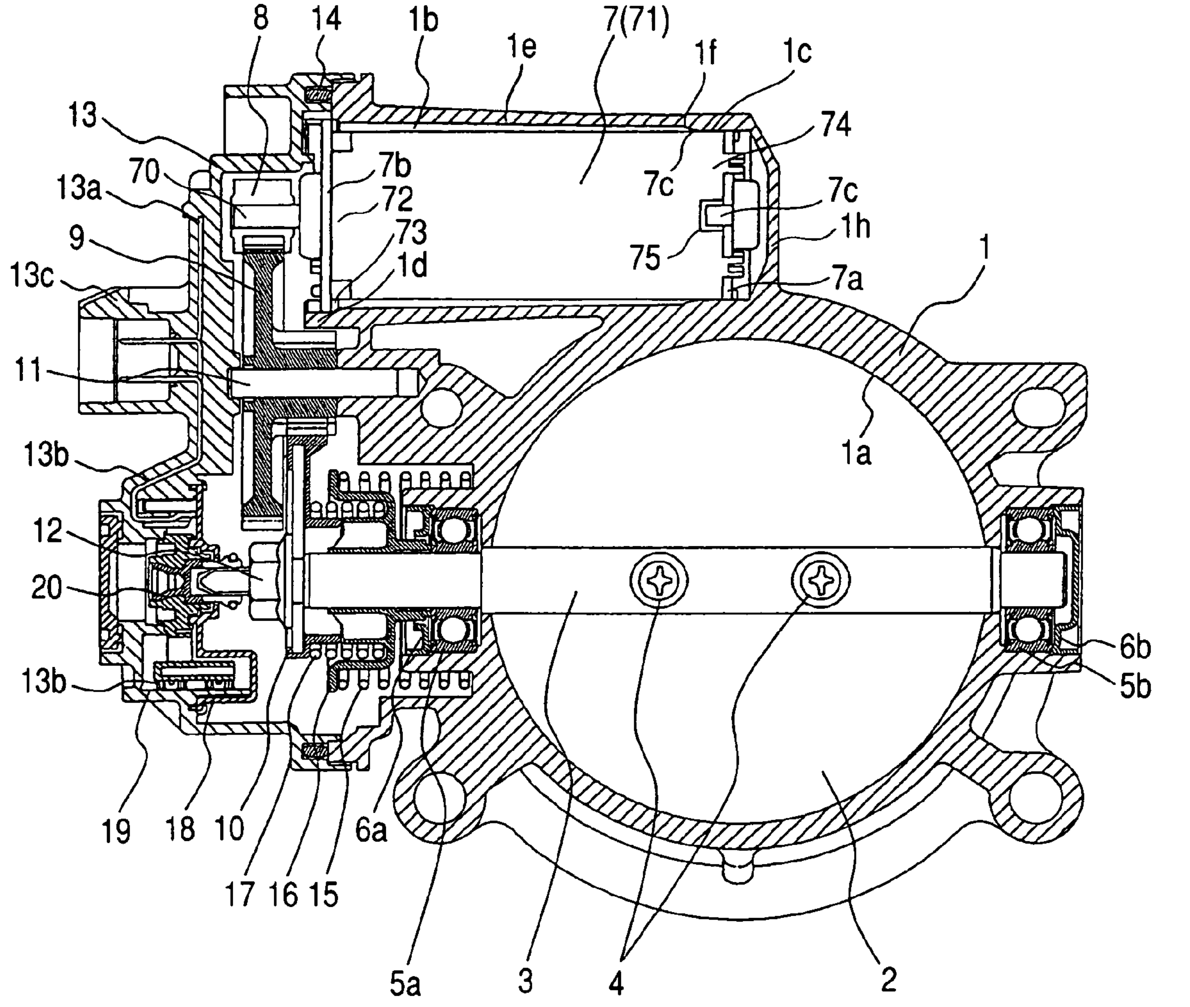
FIG. 1 is a sectional view of a typical motor-driven throttle device (a device for controlling air intake for internal-combustion engines) of the present invention.

By referring to the drawings, a preferred embodiment of the present invention will be described below.

Figure 2:
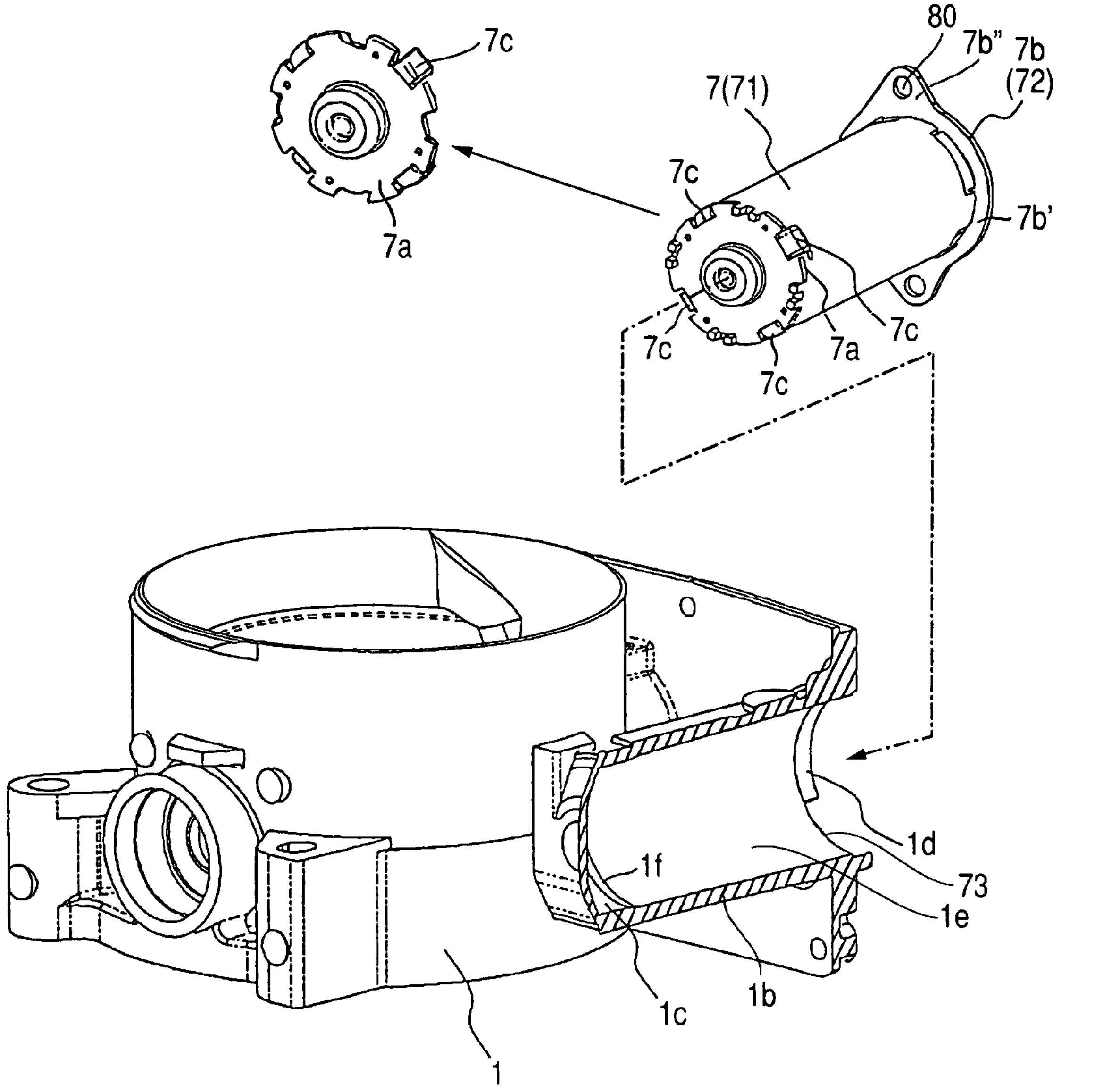
FIG. 2 is a perspective view of the throttle device of FIG. 1; wherein a section of part of the unit (motor casing) 1*b* is shown, and a perspective view of the throttle actuator (motor) removed from the motor casing is presented.
Figure 3:
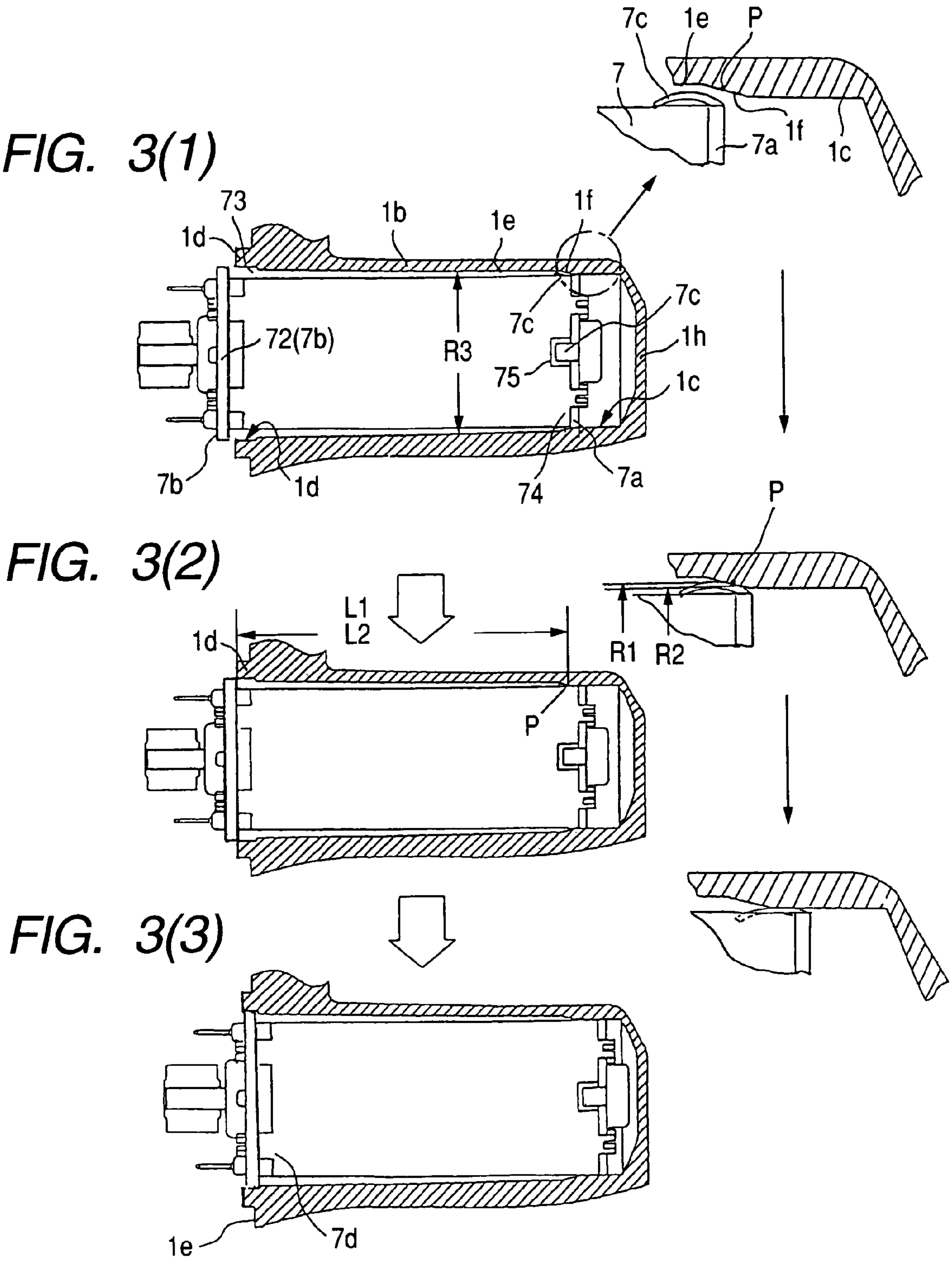
FIG. 3 is an illustration of the steps in the process of inserting the motor into the throttle body and assembling them.

FIG. 1 is a sectional view of a typical motor-driven throttle devise (a device for controlling air intake flow rate for internal-combustion engines) of the present invention. FIG. 2 is a perspective view of the throttle device of FIG. 1, wherein a part (motor casing) 1*b* of the device 1*b* is shown with a section view, and the throttle actuator (motor) removed from the motor casing 1*b* is shown with a perspective view. FIG. 3 is an illustration of the steps in the process of inserting the motor into the throttle body and assembling them.

The throttle body (also referred to as "main body" or "bore body") 1 shown in FIGS. 1 to 3 is made by aluminum die-casting. Formed inside the throttle body 1 is a bore serving as an air-intake passage 1*a*. A throttle valve 2 is disposed in the air-intake passage 1*a*.

The throttle valve 2 is fixed to a throttle shaft 3, which is supported through the throttle body 1, by set screws 4. The throttle shaft 3 is supported rotatably with bearings 5*a* and 5*b*. The bearing 5*a* is held by the throttle body 1 and a retainer plate 6*a*. The bearing 5*b* is held by the throttle body 1 and a retainer plug 6*b* and one end face is covered.

A motor casing 1*b* is molded integrally together with the throttle body 1*a*. The yoke (motor body) 71 of the motor 7 for driving the throttle valve is inserted into the motor casing 1*b*.

The motor 7 has an output shaft 70 in which one end (front side) protrude thorough the end bracket, and the output shaft 70*a* is provided with a pinion 8 for transmitting power from the motor 7 to the throttle shaft 3.

An intermediate gear 9 for transmitting power from the motor is fitted on a shaft 11 being press-fitted into the throttle body 1. A throttle gear 10 is fixed on the front end of the throttle shaft 3 by a skirt nut 12. The gears 8, 9, and 10 constitute a reduction device for transmitting power from the motor 7 to the throttle shaft 3. They are covered in a sealed state with a packing 14 and a gear cover 13 attached to the throttle body 1.

The gear cover 13 is made of synthetic resin. The gear cover 13 has a metal motor-driving terminal 13*a* and a throttle-sensor terminal 13*b*, the terminals 13*a* and 13*b* together provided into the cover 13 by insert molding. In this way, the gear cover is provided with a so-called directly mounting connector 13*c* and a throttle sensor. The throttle sensor has a rotor 20 and a resistor 19. The rotor 20 is fitted to one end side part of the throttle shaft 3. The rotor 20 has a brush 13*b*, which is in contact with the resistor 19 of the sensor. The throttle-sensor resistor 19 and the throttle-sensor terminal 18 are held by U-clip having spring elasticity. Thus, the resistor 19 and the throttle-sensor terminal 18 are electrically connected by mechanical contact. The art of driving and controlling a throttle valve with an electric motor is well known; therefore, the explanation of the art is omitted.

As shown in FIG. 1, a numeral 15 is a return spring, a numeral 16 is a default lever, and a numeral 17 is a default spring.

The arrangement for holding the motor 7 for the throttle device will be detailed below.

In the motor 7 of the present embodiment, a motor body 71 is inserted into the motor casing 1*b* through a motor-insertion opening 73. The one end portion 72 (flange 7*b*) on the output shaft side of the motor 7 is held and fixed in its radial direction in the vicinity of the motor-insertion opening 73 of the motor casing 1*b*. The other end portion 74 opposite to the output shaft side of the motor 7 is held in motor's radial direction by the inner surface of the motor casing 1*b* through the use of elastic pieces 7*c* (it may be so "flexible pieces"; refer to FIGS. 2 and 3). The motor body and the elastic pieces are formed in a single-piece design (or the elastic pieces are attached to the motor as shown in other embodiments to be described later). The elastic pieces are elastic-deformed inwardly in the radial direction of the motor by pressure from the inner surface of motor casing 1*b*.

As shown in FIG. 2, the elastic pieces (namely flexible pieces or springy pieces) 7*c* and a bearing bracket 7*a* opposite to an output-shaft side (rear end) of the motor are formed in a single-piece design. The elastic 7*c* are configured by bent-pieces which are formed on an outer edge of the bearing bracket 7*a* by sheet-metal working. Although there are four elastic pieces (bent pieces like metal plate springs) 7*c* at evenly spaced intervals in FIG. 2, the number and arrangement of spring pieces 7*c* are not limited to them.

The bent pieces 7*c* extend radially from the outer edge of the bearing bracket in a state before bending working, and they are formed by being bent from the motor rear side toward the motor front side (output-shaft side of the motor). The bending direction of the bent pieces is opposite to the direction of inserting the motor. Each bent piece 7*c* has a curved surface (see FIG. 3).

Immediately before the motor 7 is fully inserted into the motor casing 1*b*, part of the curved outer surfaces of the bent pieces 7*c* come into contact with a tapered surface 1*f* inside the motor casing 1*b* and are pressed down inwardly in the radial direction of the motor.

The above pressing will be detailed later when the process of installing the motor body into the motor casing is described by referring to FIG. 3. When pressed down, the bent pieces 7*c* are elastically deformed (flexibly deformed) inwardly in the directions of the motor. Due to such elastic deformation, the bent pieces 7*c* come into notches 75 which are made in the yoke 71 of the motor 7.

The motor casing 1*b* is configured by a cylindrical casing in which one end thereof is closed, and the other end thereof is provided with the motor-insertion opening 73. Inside of the motor casing 1*b* has a tapered surface (1*e*, 1*f*) tapering down from the motor 7-insertion opening side to toward the side opposite to the motor-insertion opening. In this embodiment, the tapered surface is configured with a first tapered surface part 1*e* making up a sizable proportion thereof (it extends from the motor-insertion opening side toward the deep recess-portion of the motor casing) and a second tapered surface part 1*f* following the first tapered surface part 1*e* at the deep recess-portion.

The slope of the second tapered surface 1*f* is larger than that of the first tapered surface 1*e*. When the motor 7 is fully inserted into the motor casing 1*b*, the rear end of the motor 7 is positioned at the non-tapered inner surface part 1*c* between the second tapered surface part 1*f* and the rear end (inner bottom) 1*h* of the motor casing 1*b* as shown in FIGS. 1 and 3. The non-tapered inner surface part 1*c* is formed in a straight cylindrical-inner surface shape.

As shown in FIG. 3, there is a gap between the outer surface of the motor 7 and the motor casing-inner surface comprising the first tapered surface part 1*e*, the second tapered surface part 1*f* and the non-tapered inner surface part 1*c*. The sum R1 of outer diameter of the motor-body 7 and the height at the highest points of the curved outer surfaces of the bent pieces 7*c* before the bent pieces (elastic pieces) are elastically deformed is larger than the inner diameter R2 at a halfway point "P" on the second tapered surface part 1*f*. But the sum diameter R1 is smaller than the inner diameter R3 at any point of the range from the first tapered surface part 1*e* up to a position immediately before the halfway point "P" of the second tapered surface part 1*f*. Accordingly, the bent pieces 7*c* come into contact with the second tapered surface 1*f* immediately before the motor 7 is fully inserted into the motor casing 1*b* as shown in FIG. 3 (3). Then, as the motor 7 is fully inserted into the motor casing 1*b*, the bent pieces 7*c* are pressed down by the second tapered surface part 1*f* and are elastically deformed in the inner radial direction of the motor.

Because the bent pieces 7*c* have a curved outer surface, their curved outer surfaces comes into contact with the second tapered surface 1*f* of the motor casing 1*b* and, thus, the bent pieces 7*c* are pressed down.

A motor guide 1*d* for guiding motor inserting are formed in the vicinity of the motor-insertion opening 73 of the motor casing 1*b*. As shown in FIG. 2, the motor guide 1*d* is configured by plural guide projections formed in the vicinity of the motor-insertion opening 73, and have arc-shaped inner faces respectively. The end on the output-shaft side of the motor 7 is restrained in the radial direction by the ark-shaped inner face of the motor guide 1*d* (for example, a part 7*b*' (see FIG. 2) of a motor-mounting flange 7*b* of the motor body 71 are put into contact with the arc-shaped inner faces of the motor guide 1*d*). Parts 7*b*" (the parts made longer than the part 7*b*' in the radial direction) of the flange 7*b* are positioned between motor guide projections 1*d*. Each parts 7*b*" has a screw-through hole 80 (see FIG. 2), and the motor 7 is secured to the throttle 1 by screws using the screw-through holes 80.

The parts 7*b*' (having smaller diameters than the parts 7*b*") of the flange 7*b* are clearance-fitted into the motor-guide (flange guide) 1*d* immediately before the motor 7 is fully inserted into the motor casing 1*b*. Thus, the end on the output-shaft side 72 of the motor 7 is fixed in its radial direction.

By referring to FIG. 3, the process of mounting the motor 7 into the motor casing 1*b* will be described below.

In FIG. 3, the reference sign "L1" is a distance from a point p1 to the end of the motor guide projections (motor guide) 1*d*. The point P1 is a point where elastic pieces (bent pieces) 7*c* of the motor 7 first come into contact with the second tapered surface 1*f* during the motor insertion process. "L2," is a distance from the point "P" to the flange 7*b* on the output-shaft side. L1 is equal to or larger than L2).

As the motor 7 is inserted into the motor casing 1*b*, the motor 7 moves from the position shown in FIG. 3 (1) (the position before the bent pieces 7*c* reach the contact point "P") to the position shown in FIG. 3 (2). FIG. 3 (2) shows the position of the motor 7 immediately before it is fully inserted into the motor casing 1*b*, namely the position of the motor 7 where the bent pieces 7*c* reach the contact point "P" on the second tapered surface 1*f*. At the time, because L1 is not shorter than L2, the outer edge of the flange 7*b* (the end on the output side of the motor) is clearance-fitted into inner faces of the motor guide projections 1*d*.

Thus, in the step of inserting the motor 7 into the motor casing 1*b* shown in FIG. 3 (2), the motor flange 7*b* is supported by the motor guide projections 1*d*. On the other hand, the center of the end 74 opposite to the output-shaft side of the motor 7 is aligned with the center of the motor casing 1*b* by the bent pieces 7*c* coming into contact with the second tapered surface 1*f*.

Then, when the motor 7 is fully inserted into the motor casing 1*b*, the bent pieces 7*c* are pressed down by the second tapered surface 1*f* and, then, by the non-tapered inner surface 1*c* as shown in FIG. 3 (3) and are elastically deformed (flexibly deformed) inwardly of the radial direction of the motor. Thus, the bent pieces 7*c* partially enter the notches 75 and the rear end 74 of the motor body 71 is firmly held in the inner surface 1*c* of the motor casing by the elasticity (springy force) of the pressed-down bent pieces 7*c*.

In the above step of full insertion, the motor flange 7*b* is guided by the motor guide projections 1*d*; therefore, the motor 7 is fully inserted into the motor casing 1*b* correctly.

Thus, the precision in assembling the motor 7 and vibration resistance of the motor 7 are improved. Besides, as the bent pieces 7*c* and the motor 7 are formed as a single piece, the number of parts is relatively small and the assembling process of the motor 7 is relatively simple. Moreover, because the elastic pieces 7*c* have a curved outer surface and the halfway parts of curved outer surfaces are pressed down by the second tapered surface 1*f* (inside of the casing), the elastic pieces 7*c* do not scrape the inside of the motor casing 1*b*, producing no metal scraps.

FIGS. 4 to 8 are partially sectional views of other embodiments of the present invention. The same reference numerals and signs commonly used between FIGS. 1 to 3 stand for the same components and elements. The differences from the first embodiment will be described below.

Figure 4:
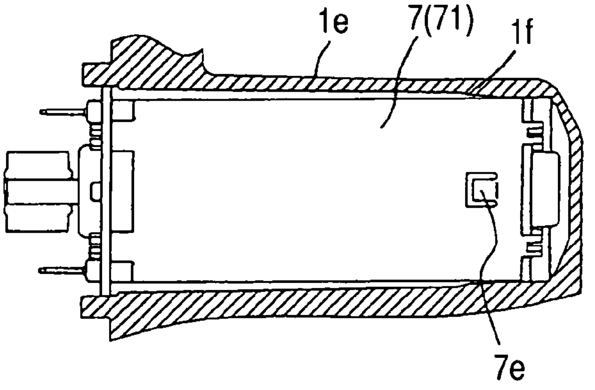
FIGS. 4 to 8 are partially sectional views of other embodiments of the present invention.

In FIG. 4, the motor body 71 as a yoke is provided with elastic pieces 7*e*. The elastic pieces 7*e* such as lugs are formed by cutting and raising parts of the yoke 71 of the motor 7. As in the case of the first embodiment, the elastic pieces 7*e* are arranged in a circumferential direction of the yoke 71. The relation between "L1" and "L2" of the first embodiment that "L1" is not shorter than "L2" holds true in this embodiment.

Figure 5:
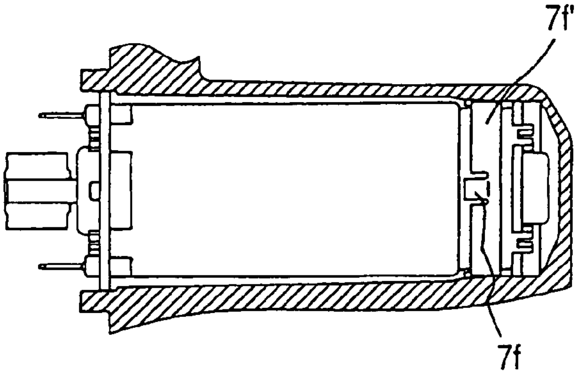

In FIG. 5, the yoke 7 is fitted with a ring (apart different from the yoke) 7*f*' with elastic pieces (flexible pieces like plate springs) 7*f*. The elastic projections (lugs) 7*f* are formed and arranged in a circumferential direction of the ring 7*f*' by cutting parts of the ring 7*f*' in the shape of a lug and raising them.

Figure 6:
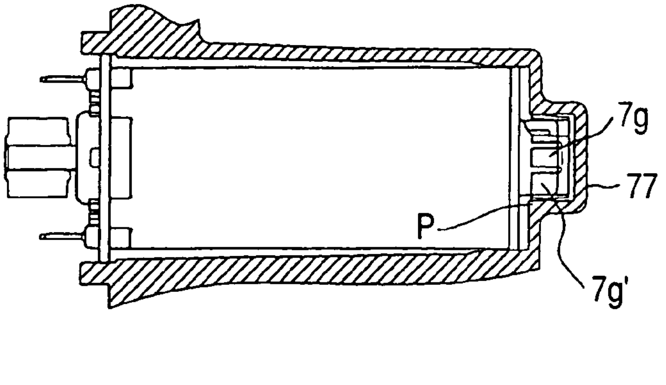

In FIG. 6, the bearing boss 77 at the rear end of the motor 7 is fitted with a ring 7*g*' with elastic pieces 7*g* (or elastic projections). This ring 7*g*' has the same workings and effect as the rings of the other embodiments. In this embodiment, the contact point "P" of the elastic pieces 7*g* is somewhere on the inner surface of the boss 77. Also, the previously described relation between "L1" and "L2" that "L1" is not shorter than "L2" holds true in this embodiment. Thus, the present embodiment has the same workings and effect as those of the previously described embodiments.

Figure 7:
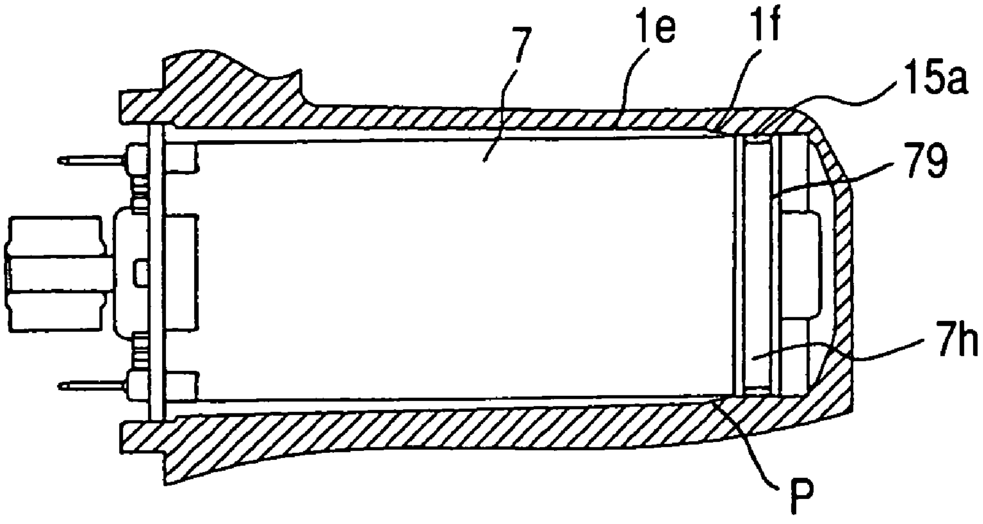
Figure 8:
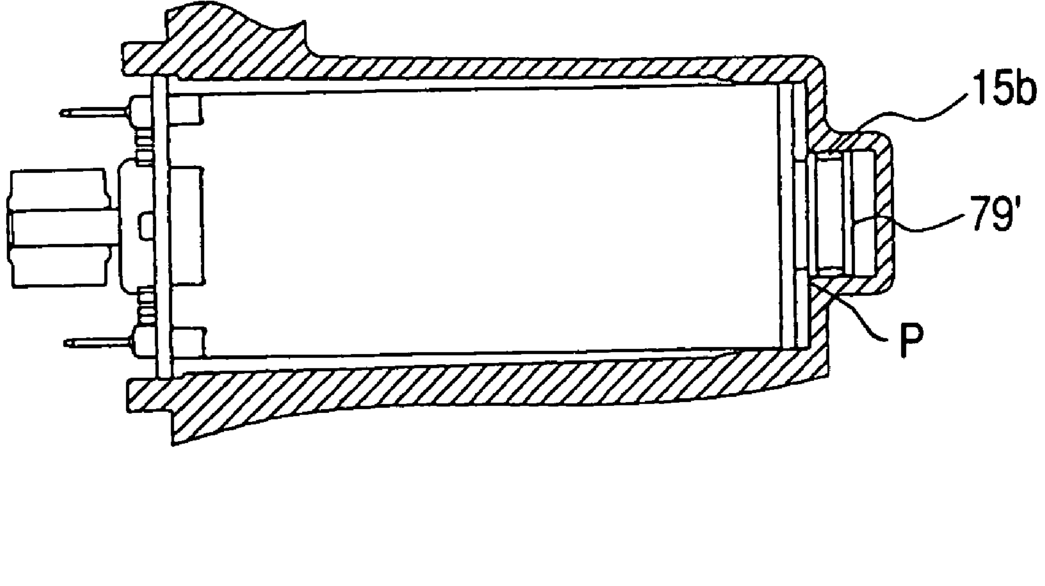

FIGS. 7 and 8 show other embodiments. In FIG. 7, one end of the yoke 7 is provided with a circumferential groove 79, and an O-ring (elastic member) 15*a* is fitted therein. The O-ring has the same effect as that of the previously described elastic pieces. The previously described relation between "L1" and "L2" that "L1" is not shorter than "L2" also holds true in this embodiment.

In FIG. 8, the bearing boss 78 at the rear end of the yoke 7 is provided with a circumferential groove 79', and an O-ring 15*b* is fitted therein. In this embodiment, the contact point "P" of the O-ring 15*b* is somewhere on the inner surface of the boss 78. The previously described relation between "L1" and "L2" that the L1 is not shorter than "L2" also holds true in this embodiment. Further, the present embodiment has the same workings and effect as those of the previously described embodiments. In addition to metal materials, the elastic pieces, rings, etc. may be made of synthetic resin. The present invention is not limited to the above embodiments, and various types of elastic pieces, elastic projections, etc. are applicable.

INDUSTRIAL APPLICABILITY

According to the present invention, a throttle device and a motor therefor in which vibration resistance of the motor and the precision in assembling the motor (precision of alignment of the motor) are improved with simple configuration can be provided.

What is claimed is:

1. A throttle device comprising a throttle body with an air-intake passage, a throttle valve for controlling the opening of said air-intake passage, and a motor for driving said throttle valve;

said throttle device further comprising:

a motor casing, which is molded integrally together with said throttle body and houses a motor body of said motor;

a motor guide, formed around a motor insertion opening of said motor casing and configured by plural guide projections having respective arc-shaped inner faces, to guide a motor mounting flange of the motor body on an output shaft side of said motor when said motor is inserted into said motor casing and to restrain said motor body in a radial direction of said motor body; and a portion, which is on a side opposite to the output shaft side of said motor body and provided with projections arranged in a circumferential direction of said motor body;

wherein said projections are formed in a single piece together with said motor body or attached to said motor body;

wherein a first inner diameter of said motor casing, from said motor insertion opening up to a predetermined point of a deep recess portion of said motor casing, is larger than an outer diameter of said motor body including said projections, and a second inner diameter of said motor casing, from said predetermined point up to an end opposite to said motor insertion opening, is smaller than said outer diameter of said motor body including said projections, so that an inner surface of said motor casing has a contact starting position, where said projections come into contact with said inner surface being pressed against said inner surface upon motor insertion into said motor casing, and a subsequent insertion area, where said motor is fully inserted up to a full motor insertion position while said projections are pressed against said inner surface of said second inner diameter;

wherein said projections are deformed inwardly in a radial direction of said motor body by being pressed down by an inner surface of said motor casing when the motor is fully inserted so that said portion opposite to the output-shaft side in said motor body is held in its radial direction in said motor casing;

wherein said motor is housed in said motor casing so as to keep a non-contact state between an outer surface of said motor body and, other than said projections, said inner surface of the motor casing; and wherein a distance between an end of said motor guide opposite to a direction of motor insertion and said contact starting position, at which said projections come into contact with said inner surface of said motor casing by being pressed against said inner surface, is larger than a distance between said contact starting position and an end face of said flange on a side facing to the direction of said motor insertion when said projections are in said contact starting position, so that said flange is guided by said motor guide before said projections reach said contact starting position at the time of motor full insertion.

2. A throttle device comprising a throttle body with and air-intake passage, a throttle valve for controlling a flow rate of air flowing through said air intake passage, and a motor for driving said throttle valve, said throttle valve further comprising:

a motor casing that is molded integrally together with said throttle body and houses a motor body of said motor;

a motor guide, formed around a motor insertion opening of said motor casing and configured by plural guide projections having respective arc-shaped inner faces, to guide a motor mounting flange of said motor body on an output shaft side of said motor when said motor is inserted into said motor casing and to restrain said motor body in a radial direction of said motor body; and a portion that is on a side opposite to said output shaft side of said motor body and provided with projections arranged in a circumferential direction of said motor body;

wherein said projections are formed in a single piece together with said motor body or attached to said motor body;

wherein a first inner diameter of said motor casing, from said motor insertion opening up to a predetermined point of a deep recess portion of said motor casing, is larger than an outer diameter of said motor body including said projections, and a second inner diameter of said motor casing, from said predetermined point up to an end opposite to said motor insertion opening, is smaller than said outer diameter of said motor body including said projections, so that an inner surface of said motor casing has a contact starting position where said projections come into contact with said inner surface being pressed against said inner surface during motor insertion into said motor casing and a subsequent insertion area, where said motor is fully inserted up to a full motor insertion position while said projections are pressed against said inner surface of said second inner diameter; and wherein a distance between an end of said motor guide opposite to a direction of said motor insertion and said contact starting position at which said projections come into contact with said inner surface of said motor casing by being pressed against said inner surface, is larger than a distance between said contact starting position and an end face of a flange on a side facing to the direction of said motor insertion when said projections are in said contact starting position, so that said flange is guided by said motor guide before said projections reach said contact starting position at the time of motor full insertion.

3. The throttle device according to claim 2, wherein said projections are formed by bent pieces or lugs.

4. The throttle device according to claim 3, wherein at least two of said bent pieces or lugs are formed in a single piece together with a component of said motor or so as to be attachable to said motor body.

5. The throttle device according to claim 3 further comprising a taper which is formed on at least a part of the inside surface of said motor casing so as to taper down from a motor insertion side toward a side opposite to said motor insertion side;

wherein said bent pieces or lugs have respectively curved outer surfaces, and said curved outer surfaces come into contact with said taper of said motor casing so that said bent pieces or lugs are pressed down.

6. The throttle device according to claim 2, wherein said projections are elastic projections.

7. The throttle device according to claim 2, further comprising a motor guide formed in the vicinity of the motor insertion opening of said motor casing;

wherein said portion is designed so as to be clearance-fitted into an inner surface of said motor guide before said motor is fully inserted into said motor casing and is. restrained in its radial direction by said motor guide.

8. The throttle device according to claim 2, further comprising a motor guide formed in the vicinity of the motor insertion opening of said motor casing;

wherein a motor mounting flange on the output shaft side of said motor body is designed so as to be clearance-fitted into an inner face of said motor guide, and said portion is restrained in its radial direction by said motor guide.

9. The throttle valve driving motor according to claim 2, wherein said projections are flexibly deformable projections formed in one single piece together with a bearing bracket or a yoke.

10. The throttle valve driving motor according to claim 2, wherein said projections comprise plural bent pieces arranged on an outer circumference of a bearing bracket at a portion opposite to the output shaft side of said motor body by. sheet-metal working, and wherein a yoke of said motor is provided with notches for receiving said bent pieces when they are elastically deformed.

11. The throttle valve driving motor according to claim 10, wherein said projections are formed on a ring attached to an outer, circumference of a yoke of said motor body.

12. The motor according to claim 11, wherein a size of said bracket in a radial direction of said bracket is larger than said outer diameter of said yoke at a position including said projections over the entire circumference of said bracket.

13. The motor according to claim 11, wherein said outer diameter of said yoke at a position including said projections has dimensions capable of pressing said projections against an inner wall of a motor casing for said motor.

14. The motor according to claim 11, wherein said projections are formed by a part of said yoke.

15. The motor according to claim 10, wherein said bracket is provided with through holes used for screws for fixing said motor to said motor casing.

16. The throttle valve driving motor according to claim 2, wherein said projections are plural lugs made by cutting and raising locally a yoke of said motor that are arranged in a circumferential direction of said motor body.

17. The motor according to claim 16, wherein said motor is housed in said motor casing so as to keep a non-contact state between the outer surface of said yoke and, other than said projections, an inner surface of said motor casing.

18. The throttle valve driving motor according to claim 2, wherein said projections are formed on a ring attached to an outer circumference of a bearing boss of said motor body.

* * * * *